(12) United States Patent
Falicoff et al.

(10) Patent No.: US 7,665,858 B2
(45) Date of Patent: Feb. 23, 2010

(54) OPTICAL MANIFOLD

(76) Inventors: Waqidi Falicoff, 24979 Constitution Ave., Apt. 1138, Stevenson Ranch, CA (US) 91381; Julio C. Chaves, Calle Ortiz Compos 5, Portal 1, 2A, Madrid (ES) 28026; Juan Carlos Miñano, Calle Santa Cruz de Marcenado 31, 7, Madrid (ES) 28015; Pablo Benítez, Calle Villa de Marin 37, 8A, Madrid (ES) 28029; Oliver Dross, Calle Santa Cruz de Marcenado 31, 7th, 20, Madrid (ES) E-28015; William A. Parkyn, Jr., 2531 Neko Dr., Lomita, CA (US) 90717

( * ) Notice: Subject to any disclaimer, the term of this patent is extended or adjusted under 35 U.S.C. 154(b) by 277 days.

(21) Appl. No.: 11/982,480

(22) Filed: Nov. 2, 2007

(65) Prior Publication Data

US 2009/0116215 A1 May 7, 2009

(51) Int. Cl.
*F21V 33/00* (2006.01)

(52) U.S. Cl. ............... 362/84; 362/249.02; 359/634; 359/640

(58) Field of Classification Search .............. 362/84, 362/249.02, 235; 359/634, 640
See application file for complete search history.

(56) References Cited

U.S. PATENT DOCUMENTS

| 3,202,039 | A | 8/1965 | De Lang | 88/1 |
| 3,905,684 | A | 9/1975 | Cook et al. | 350/173 |
| 5,812,405 | A | 9/1998 | Meredith | 364/473.01 |
| 5,999,321 | A | 12/1999 | Bradley | 359/587 |
| 7,068,430 | B1 | 6/2006 | Clarke et al. | 359/589 |
| 7,230,768 | B2 | 6/2007 | Pinho | 359/634 |
| 7,286,296 | B2* | 10/2007 | Chaves et al. | 359/641 |
| 2009/0040523 | A1* | 2/2009 | Brukilacchio | 356/432 |

OTHER PUBLICATIONS

J.D. Rancourt, *Optical Thin Films*, Fig.3.1, SPIE Press 1996.
Baumeister, Phillip W., *Optical Coating Technology*, pp. 1-79, 1-84, 5-66, Fig. 1-189, SPIE Press, Birmingham WA, 2004.

* cited by examiner

*Primary Examiner*—Laura Tso
(74) *Attorney, Agent, or Firm*—Drinker Biddle & Reath LLP

(57) ABSTRACT

Optical systems are described that have at least one source of a beam of blue light with divergence under 15°. A phosphor emits yellow light when excited by the blue light. A collimator is disposed with the phosphor and forms a yellow beam with divergence under 15°. A dichroic filter is positioned to transmit the beam of blue light to the phosphor and to reflect the beam of yellow light to an exit aperture. In different embodiments, the beams of blue and yellow light are incident upon said filter with central angles of 15°, 22°, and 45°. The filter may reflect all of one polarization and part of the other polarization, and a polarization rotating retroreflector may then be provided to return the unreflected light to the filter.

19 Claims, 10 Drawing Sheets

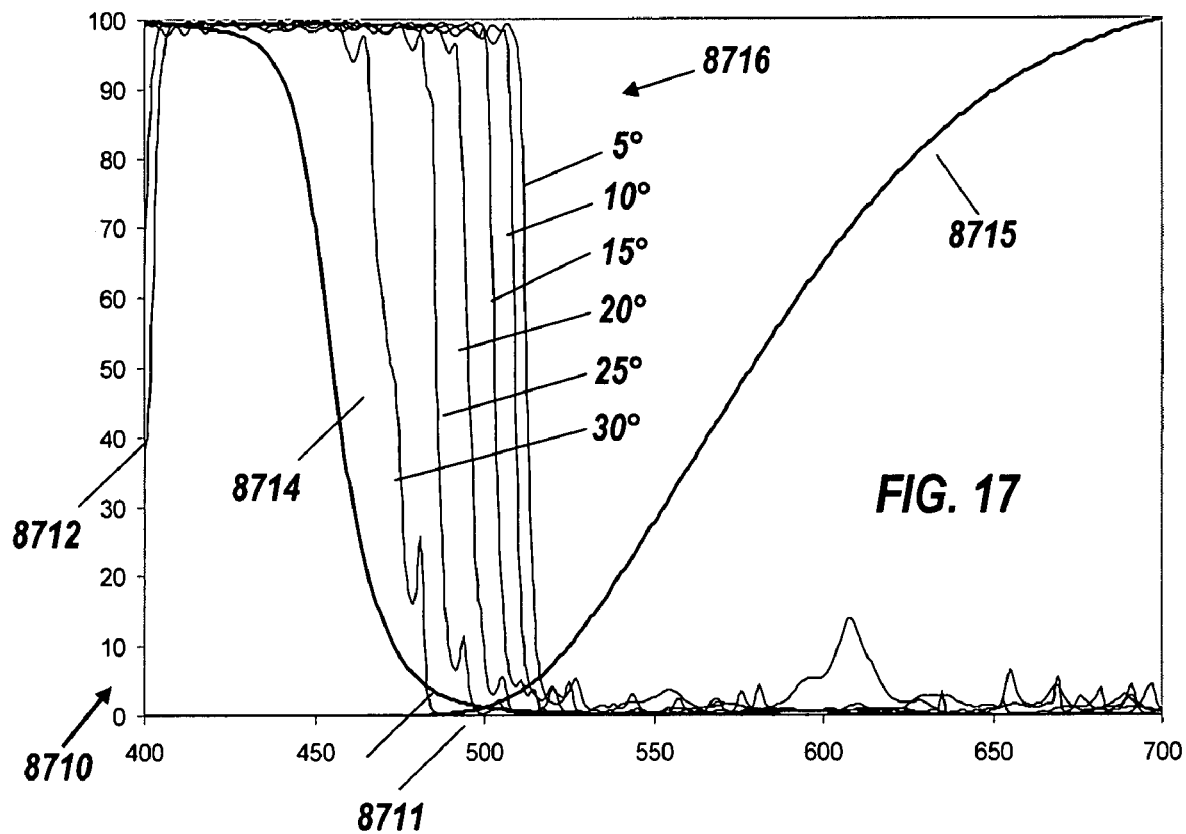
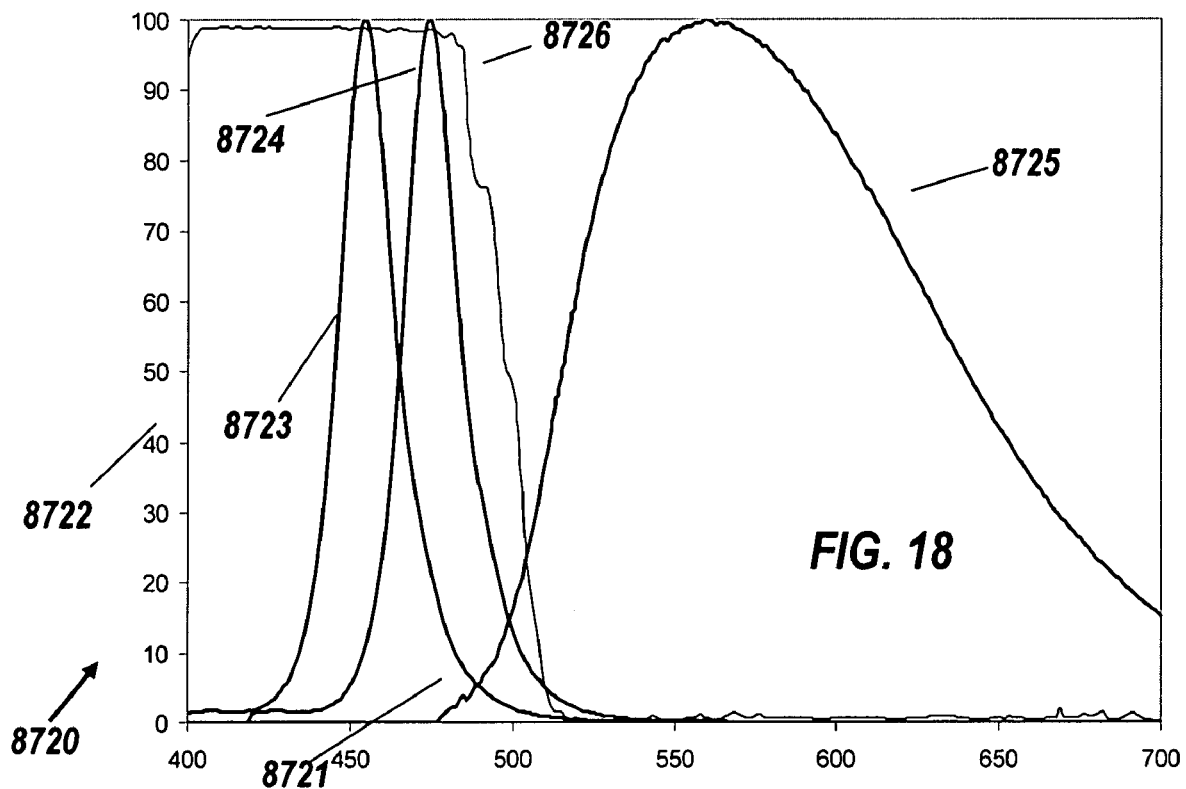

OPTICAL MANIFOLD

STATEMENT REGARDING FEDERALLY FUNDED RESEARCH AND DEVELOPMENT

This invention was supported in part by the National Energy Technology Laboratory Award No. DE-FC26-05NT42341. The Government may have certain rights in this invention.

CROSS REFERENCE TO RELATED APPLICATIONS

This application is filed concurrently with U.S. patent application Ser. No. 11/982,492, of Falicoff for "Wideband Dichroic Filter Design for LED-Phosphor Beam-Combining," the disclosure of which is incorporated herein by reference in its entirety.

BACKGROUND OF THE INVENTION

1. Field of the Invention

The present invention relates generally to optical systems using a phosphor to convert light of one color to another color.

2. Description of Related Art

Light emitting diodes (LEDs) are a widely available, inexpensive, and efficient light source. However, a typical LED provides light of a single dominant color, with a very narrow spectral range.

It has previously been proposed to use a blue LED to excite a white phosphor, thus combining the simplicity of an LED as an electrically-powered light source with the better spectral output of a phosphor, or to use a blue LED to excite a yellow phosphor and combine the yellow light with unconverted blue light to produce a substantially white output beam. However, the LED prior art is also less than satisfactory regarding the geometry of phosphor utilization in LEDs, such as for LEDs that generate white light. Commonly-assigned U.S. Pat. No. 7,286,296 of Chaves et al. proposes novel configurations of manifolds for combining LED and phosphor light, but there is still room for further improvement.

The above-referenced concurrently filed application discloses dichroic filters for combining the blue light of an LED and the yellow light from a photostimulated patch of phosphor into a single white output beam. Because both the blue and yellow light as they emerge from the LED and the phosphor are uncollimated, no presently-available filter can efficiently combine their light until the range of incidence angles has been restricted. The most geometrically convenient beam-combination angle is 45°, but unless the light is polarized only a narrow angular range can be accommodated without loss of efficiency, typically 42-48°, whereas a realistic illumination system will exhibit a 30-60° range of angles into the filter. This ±15° range, however, is relatively narrow as collimation range goes, and cannot be expected to be smaller. While a 45° angle of beam combination is well known from RGB displays, it has not been possible to overcome the severe polarization effects that occur at this angle. In order to overcome this, several RGB display systems were developed where the band-pass operates at less than 45°.

A well known system that operates at a nominal 30° is the so-called Philips color TV camera. This system is described on pg. 1-79 of the book "Optical Coating Technology" by P. W. Baumeister, SPIE Press 2004. According to Baumeister (pg. 1-79) this "30°" design "has become an industry standard" and is based on U.S. Pat. No. 3,202,039, which describes the incidence angles as "smaller than 30°" without specifying the angle more precisely. Another approach is given in U.S. Pat. No. 3,905,684. In this prior art the band-pass filter operates at a nominal angle of 16° according to Baumeister (pg. 1-84) and therefore is an improvement over U.S. Pat. No. 3,202,039, as it is much easier to design a short or long pass filter that operates about this incidence angle. Baumeister states (pp. 1-84) that "The aforementioned Philips system has been used in a projection system . . . . In a modification [Cook 75], FIGS. 1-189 shows that an additional wedge prism is added to the entrance face, which permits the angle of incidence upon the blue dichroic (that follows) to be 16° for an axial ray. This is compared with the 30° angle for the system in §1.8.4.2.1 [the Philips system of U.S. Pat. No. 3,202,684]. It follows from the discussion . . . that this relatively small angle reduces the polarization splitting."

The above-referenced concurrently-filed U.S. patent application of Falicoff discloses short-pass filters operating at a nominal incidence angle of 15°, and methods of designing such filters. The present application discloses manifold systems for combining un-polarized yellow and blue light based on a short-pass filter operating at a nominal incidence angle of 15°, for which the novel filters of the concurrently-filed application, while not essential, are especially suitable.

SUMMARY OF THE INVENTION

Embodiments of optical manifolds are described herein that provide the ability to efficiently convert a beam of light with a phosphor, and especially (but not exclusively) to collimate the blue light output of one or more blue LEDs, concentrate that light onto a yellow phosphor, and then combine and collimate the yellow light from the phosphor with the same or different blue light into a single substantially white output that is substantially homogeneous.

According to one embodiment of the invention, there is provided an optical system comprising at least one source of a beam of blue light with divergence under 15°, a phosphor that emits yellow light when excited by said blue light, a collimator disposed with said phosphor and forming a yellow beam therefrom with divergence under 15°, and a dichroic filter positioned to transmit said beam of blue light to the phosphor and to reflect said beam of yellow light to an exit aperture, said beams of blue and yellow light being incident upon said filter with a central angle (the angle of incidence of the center of the beam) of 15° and a distribution of incidence angles thereabout between 0° and 30°.

According to another embodiment of the invention, there is provided an optical system comprising at least one source of a beam of blue light with divergence under 15°, a phosphor that emits yellow light when excited by said blue light, a collimator disposed with said phosphor and forming a yellow beam therefrom with divergence under 15°, and a dichroic filter positioned to transmit said beam of blue light to the phosphor and to reflect said beam of yellow light to an exit aperture, wherein said optical system is so aligned that said beams of blue and yellow light are incident upon said filter with a central angle of 30° and a distribution of incidence angles thereabout between 15° and 45°.

According to a further embodiment of the invention, there is provided an optical system comprising at least one source of a beam of blue light with divergence under 15°, a phosphor that emits yellow light when excited by said blue light, a collimator disposed with said phosphor and forming a yellow beam therefrom with divergence under 15°, and a dichroic filter inclined 45° and positioned to reflect all of one polarization and part of the other polarization of said beam of blue light to the phosphor and to reflect said beam of yellow light to an exit aperture, said beams of blue and yellow light being incident upon said filter with a central angle of 45° and a distribution of incidence angles thereabout between 30° and 60°, said system further comprising a polarization rotating retroreflector which returns said polarized blue light to said filter, which reflects it out said exit aperture in parallel alignment and overlap with said yellow beam.

According to a further embodiment of the invention, there is provided an optical system comprising at least one source of a beam of blue light with divergence under 15°, a phosphor that emits yellow light when excited by said blue light, a collimator disposed with said phosphor and forming a yellow beam therefrom with divergence under 15°, and a dichroic filter in air inclined 45° and positioned to reflect all of one polarization and part of the other polarization of said beam of blue light to the phosphor and to reflect said beam of yellow light to an exit aperture, said beams of blue and yellow light being incident upon said filter with a central angle of 45° and a distribution of incidence angles thereabout between 30° and 60°.

According to a further embodiment of the invention, there is provided an optical manifold according to the present invention in which the dichroic filter is a filter as disclosed and/or claimed in the above-mentioned concurrently filed application.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 17 is a graph of the spectral performance of the filter at various incidence angles, along with the cumulative spectra of LED and phosphor.

FIG. 18 is a graph of total filter performance in the context of LED and phosphor spectra.

DETAILED DESCRIPTION OF THE PREFERRED EMBODIMENTS

Reference will now be made in detail to various embodiments of the present invention, examples of which are illustrated in the accompanying drawings. The embodiments are described by way of explanation, and not by way of limitation.

Numerous embodiments in the above-mentioned U.S. Pat. No. 7,286,296 of Chaves et al. use a spectrum-splitting mirror operating at 45° to the flow of light. While such devices are common in color-combining LCD projectors, they typically are effective only for one polarization. Normal-incidence dichroic mirrors have no such problem, since both polarizations behave identically. Also, at angles near normal incidence, the wavelength shift of the mirror's reflectance spectrum as the angle changes is less than at higher incidence angles, because the cosine function is changing slowly: cos 0°/cos 10°=0.985 while cos 55°/cos 45°=0.811. Thus a 10° range of incidence between 0° and 10° causes a 1.5% shift, or 7.5 nm at a nominal wavelength of 500 nm, whereas the same range between 45° and 55° causes a 19% shift; or 95 nm at the same wavelength, precluding all but the narrowest beams (±3°). This cosine relationship is approximate but is representative of the performance of commercially available short-pass filters.

At this time there are no short-pass or long-pass dichroic mirrors or filters that can effectively handle a wide range of incidence angles centered at a 45 degree nominal angle of incidence. So-called omni-directional band-pass filters are not yet possible using traditional thin film coatings. Even a very sophisticated technology such as rugate filters cannot overcome the limitation of existing thin film technology. The 3M Company of Minnesota claims to have the capability of doing this by manufacturing films containing as many as a thousand layers. Each layer in the film can also be anisotropic, thereby providing an extra degree of freedom to the design. However, no such product has been released by this company and it therefore remains to be seen if this technology is in fact capable of achieving the goal. In summary there are two fundamental problems with systems that employ a band-pass filter operating around 45 degrees. First, they exhibit strong angle shift from one angle of incidence to the next. Secondly, they cannot handle properly both states of polarization when the angle of incidence is close to 45 degrees, or more specifically when the angle of incidence gets close to the Brewster angle.

Figure 1:
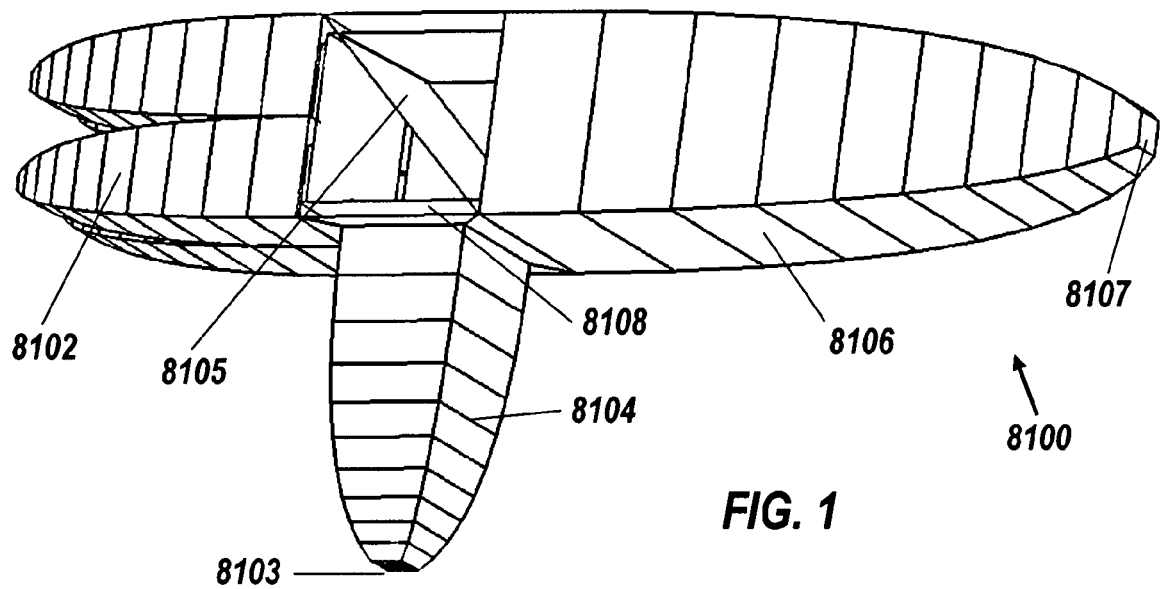
FIG. 1 is a cutaway perspective view of a T-shaped optical manifold with its dichroic mirror in air.

One reason for the second problem is that the previously proposed 45° filters operate within a dielectric, which greatly reduces the differential refractive index when light enters the filter. FIG. 1 discloses a preferred embodiment with the 45° mirror in air. The filter 8105 shown in FIG. 1 has a thin, flat structure bounded by air/dielectric interfaces parallel to the plane of the filter, and thus at 45° to the central axes of the incident, transmitted, and reflected beams in the air. Not only does this supply a large differential refractive index, but also it reduces the 45° incidence angle to 28° inside the filter, and a 55° angle to 33°. The above-mentioned cosine effect is reduced to cos 33°/cos 28°=0.95, for a spectral shift of 25 nm, causing only mild losses. Other small losses will accrue from Fresnel reflections when light goes into air, and from geometric losses due to beams overly expanding. The Fresnel losses can be reduced by designing the filter to include an anti-reflective coating. This must, however, be optimized so that the differential refractive index is not reduced. Such filters are presently available from a number of commercial sources such as JDSU of Santa Rosa, Calif.

FIG. 1 shows a cutaway view of remote phosphor system 8100, comprising four input solid dielectric square CPCs 8102 each coupled to a blue LED (not shown in detail), auxiliary blue LEDs 8103 and their 15° solid dielectric square CPC 8104, spectrum-splitting mirror 8105, large 15° CPC 8106 and transparent phosphor 8107, and dielectric hollow tube 8108 shown cutaway to reveal spectrum-splitting mirror 8105, designed to operate in air, not a dielectric. The walls of tube 8108 transfer light via total internal refection (TIR). Optionally the side in FIG. 1 that is cutaway from dielectric tube 8108 and the side opposite it can be replaced with mirrors.

Figure 2:
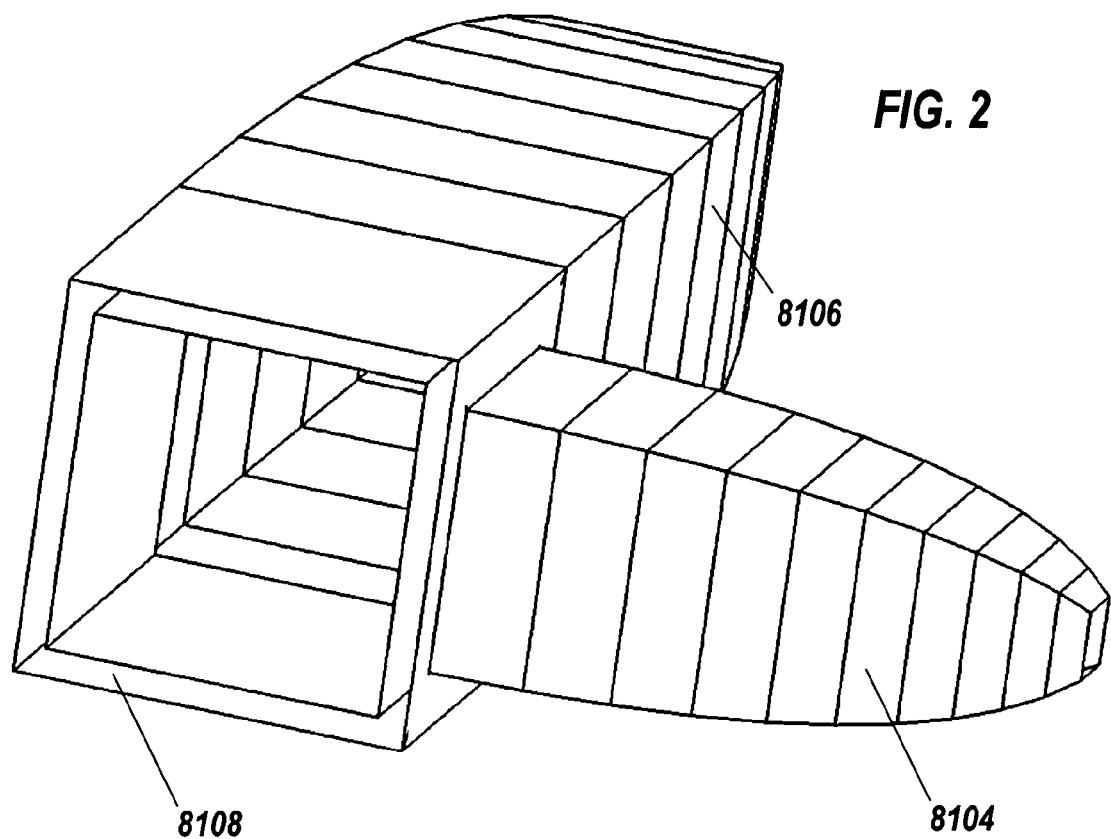
FIG. 2 is another cutaway view of the manifold shown in FIG. 1.

FIG. 2 shows a perspective view of same, cutaway to show the interior of dielectric hollow tube 8108, optically bonded to the face of CPC 8106. CPC 8104 can be seen to be optically bonded to the outside of tube 8108, which has the basic function of containing the spread of light coming out of CPCs 8102, ensuring that most of it goes into CPC 8106.

Figure 3:
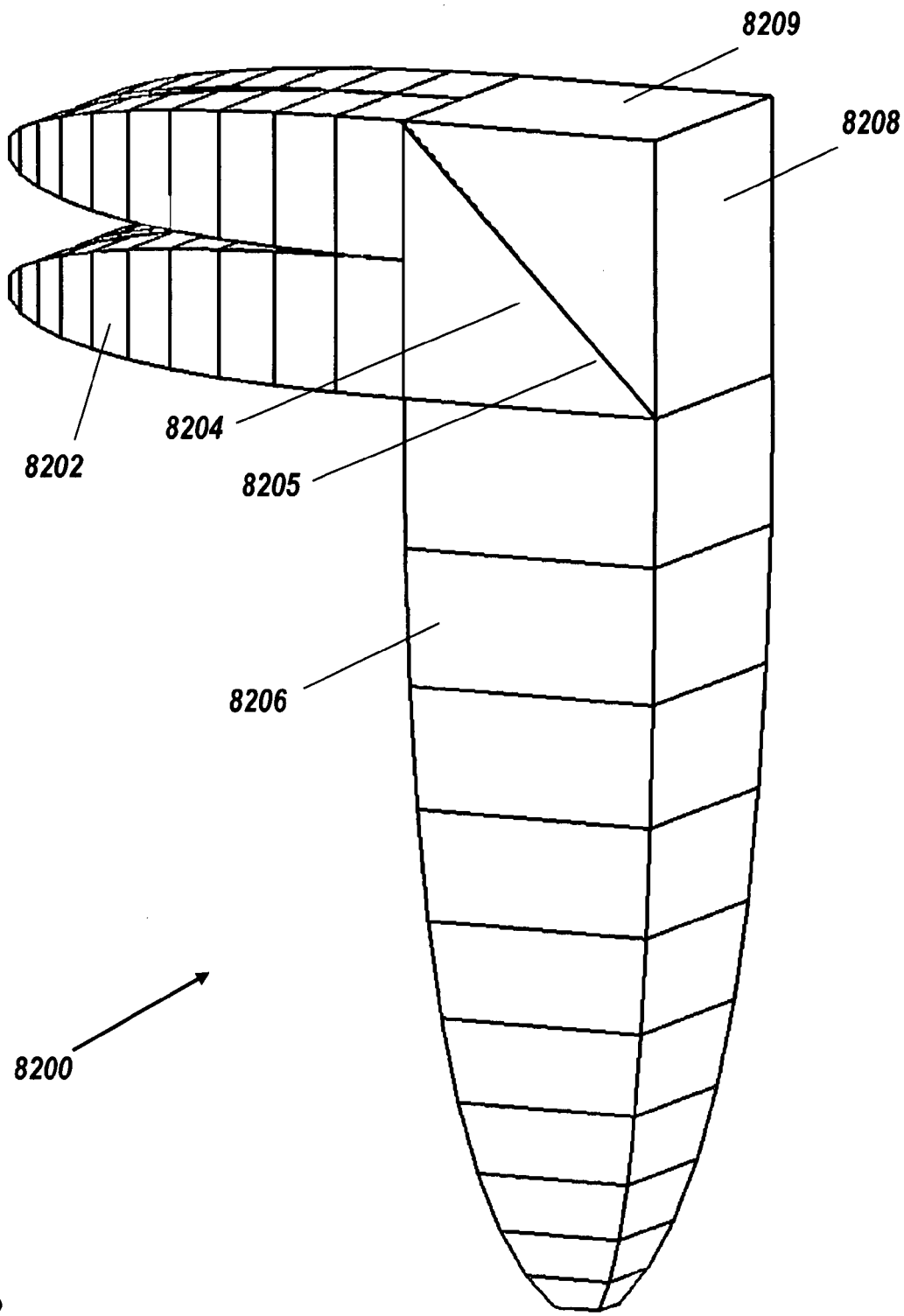
FIG. 3 shows a L-shaped optical manifold with a phase-rotating reflector.

FIG. 3 shows an alternative preferred embodiment that uses a 45° dielectric-immersed spectrum-splitting mirror that is optimized for one polarization, while allowing part of the other polarization to be transmitted. This transmitted polarized light is then reflected by a 180° phase rotator, causing this light to be reflected out of the system. FIG. 3 shows remote phosphor system 8200, comprising four input CPCs 8202 each coupled to a blue LED (not shown), prism block 8204, polarized spectrum-splitting mirror 8205, large CPC 8206 for a transparent phosphor that is not shown, and phase rotator 8208. Mirror 8205 reflects all blue light of one polarization and only part of the other. Rotator 8208 rotates that other polarization into the plane of the first, causing it to be reflected through output port 8209. Proper design of mirror 8205 will result in that output blue light balancing the yellow photo-stimulated light of the phosphor to white As the principal reflection angle of spectrum-splitting mirrors decreases, their design becomes easier to implement for both polarizations. Instead of 45°, prism configurations are possible that utilize incidence angles of 30° and 15°.

The prisms shown hereafter have a refractive index of 1.64 to ensure against TIR failure. Practical considerations formerly dictated a lower index, the 1.57 value of the glass BAK-4, because a wide variety of shapes is commercially available for prisms in this material. Newer materials are now available at n=1.64, for the small wedge-prisms required for these embodiments. For example Ohara Corporation of Japan produces a suitable high transmittance glass PBM2Y. This higher index material has an added advantage in that it reduces the beam angle that strikes the dichroic filter. For example if the maximum beam angle in the dielectric collimator (with an index of 1.5) is 15°, this angle will be reduced to approximately 13.7° in the high-index prism.

Figure 4:
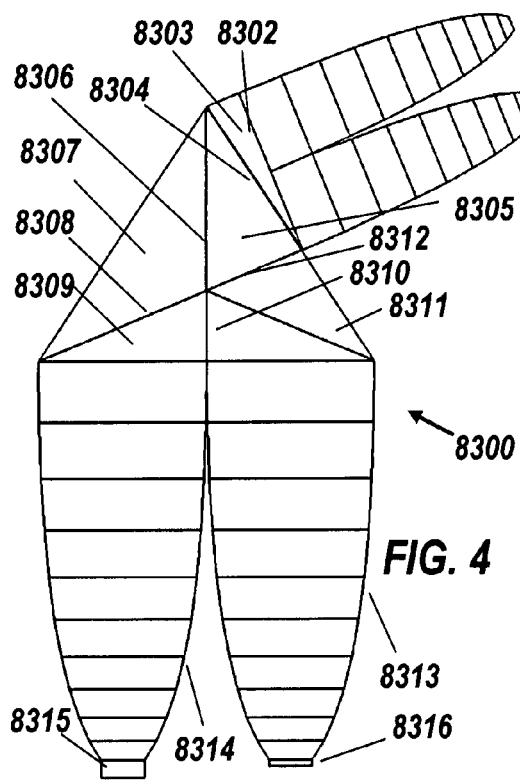
FIG. 4 shows a collimating white-light optical manifold based on a 22°-incident dichroic filter

FIG. 4 shows a remote phosphor system 8300, comprising photostimulative blue LEDs 8301, 10° dielectric square CPCs 8302 (two of the four are shown), 12° wedge prism 8303 optically coupled thereto, air gap 8304, scalene triangular prism 8305 having angles 34° (top as seen in FIG. 4), 68° (left bottom) and 78° (right bottom), dichroic filter 8306, 34° isosceles triangular prism 8307, two oppositely oriented 22° right-angle triangular prisms 8309 with low-index gap 8310 between them and low-index gaps 8308 above each, scalene triangular prism 8311 having angles 102°, 44° (left bottom) and 34° (right bottom) and disposed across low-index gap 8312 from prism 8305, large 15° dielectric square CPCs 8313 and 8314, transparent-phosphor box 8315, and auxiliary-blue LED-array 8316. (Alternatively, the transparent phosphor can be replaced by a standard phosphor patch. The phosphor material in this case should have low absorptance to its emission.) The low-index gaps confine collimated rays that are at glancing angles, guiding them via total internal reflection (TIR) so that they stay with their beam. For example, a silicone adhesive with refractive index of 1.4 would confine rays with an angle of incidence higher than $\sin^{-1}$ (1.45/1.64)=62°, far less than the 75° minimum expected if the light emanates from a 15° collimator with its axis parallel to the gap. Thus, the entire effective beam from such a collimator can be confined by such a low-index gap.

Figure 5:
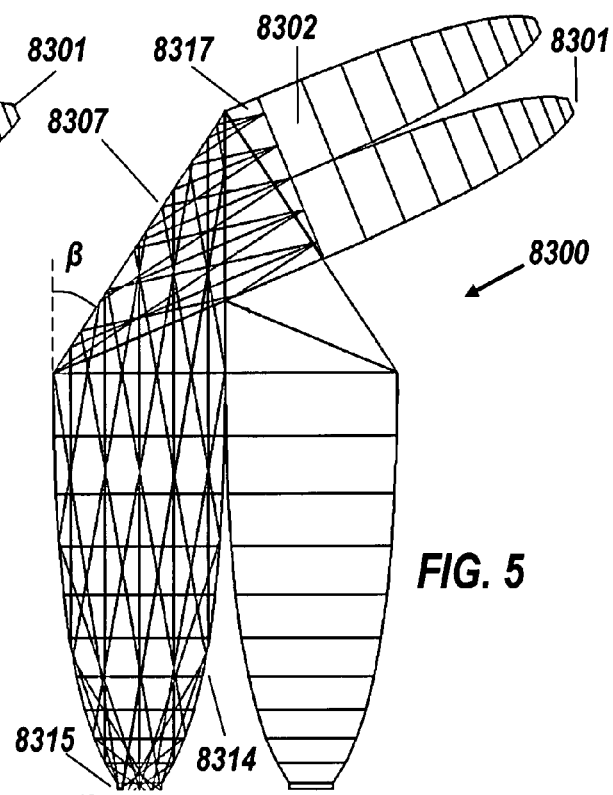
FIG. 5 shows the manifold of FIG. 4 passing photostimulative blue rays through to the phosphor.

FIG. 5 shows the photostimulative operation of remote phosphor system 8300. The system angle β of 34° is also shown. Square CPCs 8302 collect light from blue LEDs 8301 to form a collimated output beam shown as rays 8317 proceeding down to the left through wedge prism 8303 and across air gap 8304, after which some of its rays glance off low-index gap 8312. Because of its short wavelength, the blue light of this beam passes through dichroic filter 8306, after which some of its rays glance off low-index gap 8308. Then it internally reflects on the exit face of prism 8307, thereby turned downward, after which some of its rays glance off low-index gap 8310. The blue beam enters large square CPC 8314, which concentrates it into box 8315, wherein it is absorbed by the transparent or standard phosphor which box 8315 contains. All along the blue beam's way, the various low-index gaps keep rays from escaping the beam and ensure the whole beam is directed to enter solid dielectric square CPC 8314.

Figure 6:
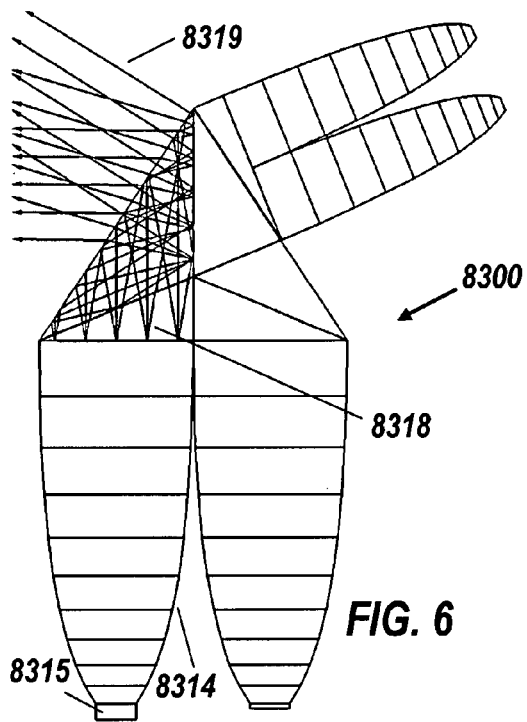
FIG. 6 shows the manifold of FIG. 4 passing yellow phosphor light into an output beam.

FIG. 6 shows the yellow-emitting operation of remote phosphor system 8300. The photostimulated transparent phosphor within five-sided reflective box 8315 will emit yellow light, which large CPC 8314 collimates into a beam represented by rays 8318. They pass upward to be internally reflected by the exit face of prism 8307. Due to their long wavelengths, the yellow rays reflect off of dichroic filter 8306, thereafter passing out of the exit face of prism 8307 to form yellow output beam 8319. Low-index gap 8310 confines glancing rays, as does filter 8306, so that all yellow rays strike the exit face of prism 8307 instead of leaving the required beam.

Figure 7:
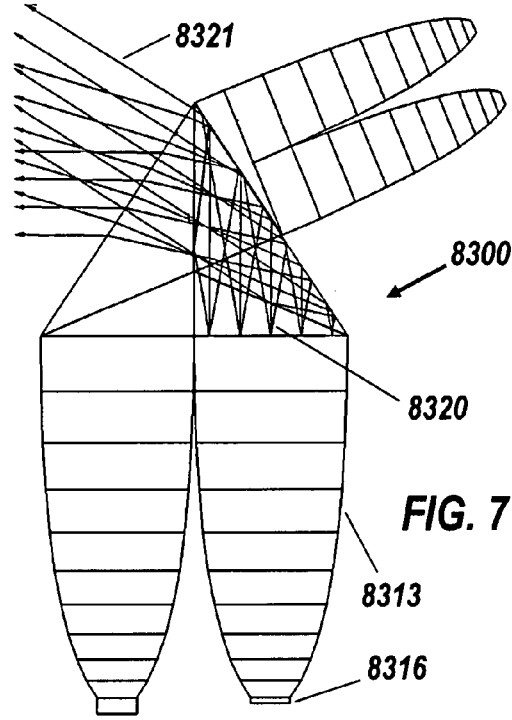
FIG. 7 shows the manifold of FIG. 4 passing auxiliary blue light into the same output beam.

FIG. 7 shows the auxiliary blue operation of remote phosphor system 8300. Light from auxiliary blue LEDs 8316 is collimated by large CPC 8313 into a beam represented by rays 8320. The leftmost rays are confined by vertical low-index gap 8310, but also by dichroic filter 8306. Because of their glancing angle, vertical rays encountering the filter will be reflected because their high incidence angle has lengthened their effective wavelength and shifted their filter response from transmission to reflection. The right-hand vertical rays internally reflect leftwards off the exterior of prism 8311, and pass through low-index gap 8312. The left-hand rays go through low-index gap 8312 and are internally reflected leftwards off air gap 8304. Because of their short wavelength, all rays can pass through dichroic filter 8306 and pass out of the exit face of prism 8307 to form blue output beam 8321, coincident with yellow output beam 8319 to thereby form a white beam. Although dichroic filter 8306 is specified for a principal incidence angle of 22°, the full range is 0-40°, so that some of the rays at the edge of this range may encounter reduced efficiency.

The behaviors of short-pass and long-pass filters at high incidence angles are not commonly considered. In fact for current commercially available designs for incidence angles above 70 degrees, the filter does not behave as a reflector. Typical reflectance values at these incidence angles for commercially short-pass filters are on the order of perhaps 50%. This is not a sufficiently high enough performance for the preferred embodiment of FIG. 7. The reason for this is that the thickness of most layers in a thin film is typically around a quarter wavelength, which for a reference wavelength of 500 nm is around 125 nm. At this thickness, evanescent waves can jump across the layers at high incidence angles, via the phenomenon of frustrated total internal reflection. One way to overcome this problem that has been developed by the Inventors is to add one thick layer into the filter. The thickness of this layer should be on the order of two wavelengths. A preferred thickness is approximately 1200 nm. A suitable material for the layer is silicon dioxide. The thick layer must be designed to work in conjunction with the other layers at the angles of incidence required by the short-pass filter (at the lower incidence angles). Examples of such designs using 80 layers are shown in Tables 2 and 3 of the concurrently-filed application for the preferred embodiment of FIG. 8. Note that the first layer of the coating in Table 3 uses an 1172 nm layer of silicon dioxide. Tables 1 and 4 show respectively 80-layer and 82-layer designs that work nearly as well as those of Tables 2 and 3 but without the thick first layer.

It is possible to reduce the principal incidence angle to 15°, thereby reducing the range to 0-30°, enabling very high efficiency to be attained. The efficient operation of these preferred embodiments hinges on the design of the dichroic filter. The auxiliary blue output is reduced to the extent that the filter's blue transmittance is less than 100%, and likewise any loss in transmittance of the photostimulating blue reduces how much yellow light is produced. Then the yellow light itself is reflected by the filter with less than perfect efficiency. In the following preferred embodiments the filter transmits 97.8% for blue and reflects 97.8% for yellow, for an overall yellow-beam score of 95.4%.

A novel 80-layer bi-material filter is disclosed in the concurrently-filed application that attains this high score over the 0-30° incidence-angle range. No previous filter of the prior art could do this, but then none was ever needed, at non-normal incidence at least, to both transmit unpolarized blue light and reflect unpolarized yellow light. The 80-layer thickness-specification listed in Table 3 of the concurrently-filed application is operative in the following preferred embodiment. This filter also reflects both blue and yellow light at high incidence angles (above 70 degrees). The filter design employs the aforementioned approach of a thick single thick layer of approximately 1200 nm as the first of 80 layers. In the original optimized design for the short-pass filter for this embodiment, the first layer had a thickness of approximately 94 nm. It was discovered that the performance of the filter in the short-pass mode (for angles 0 to 30 degrees) is insensitive to variations of the thickness of the first layer in the stack. This is not the case for traditional short-pass filters and is made possible by the development of a new algorithm for the design of such devices. (This is the subject of the concurrently filed application.) The performance of the filter at high incidence angles is greatly enhanced by increasing the thickness of the first layer. At 1200 nm thickness, the reflectance at incidence angles above 70 degrees in the direction of the yellow light (from the left as seen in FIGS. 4 to 7) is theoretically perfect, 100%. In the blue light direction, the average reflectance is on the order of 99% over the same range of incidence angles. This is achieved when layer 80 of the filter is oriented so it is the first layer of the stack that is impinged upon by the rays emanating from the phosphor.

Figure 8:
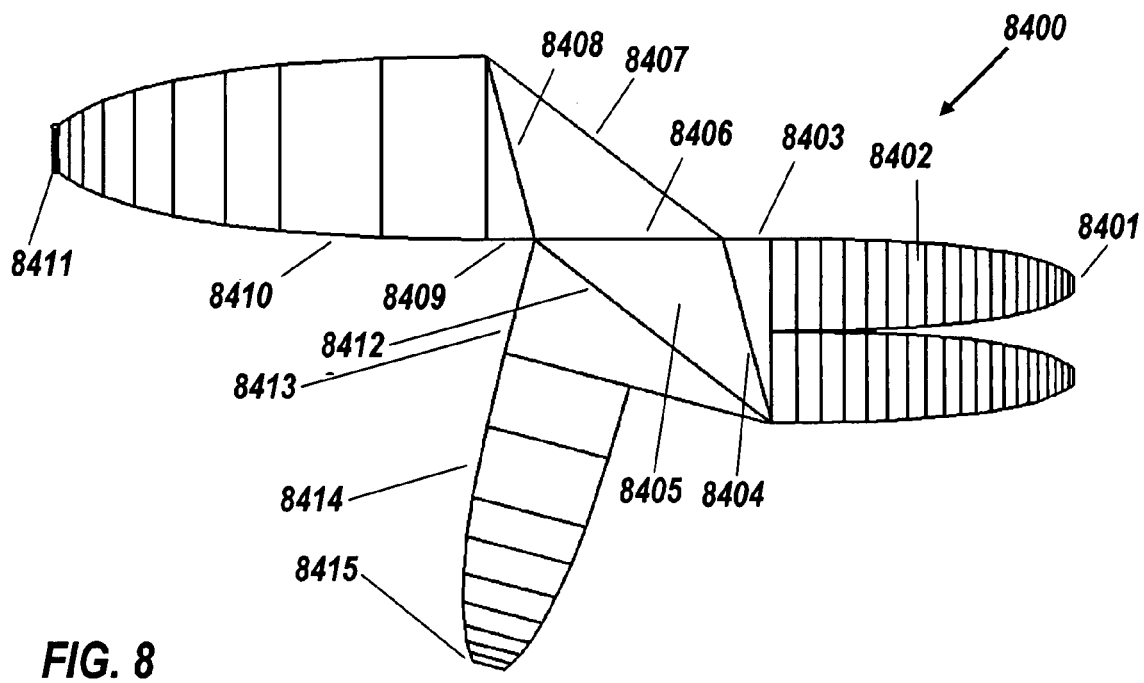
FIG. 8 shows a collimating white-light optical manifold based on a 15°-incident dichroic filter.

FIG. 8 shows a further remote phosphor system 8400, comprising photostimulating LEDs 8401, 10° dielectric square CPCs 8402 (two of four are visible), first right-angle 15° prism 8403 coupled to the square CPCs 8402, a low-index gap 8404, a first isosceles triangular prism 8405, a dichroic filter 8406 with either of the aforementioned 80-layer specifications, a second isosceles triangular prism 8407 (both isosceles prisms 8405 and 8407 have angles of 37.5°, 37.5° and 105°), a low-index gap 8408, a second right-angle 15° prism 8409, a large 15° dielectric CPC 8410, a box 8411 enclosing a transparent or standard phosphor, an air gap 8412 between the diagonal hypotenuse of prism 8405 and an adjacent right-angle 22.5° prism 8413, a small 15° dielectric CPC 8414 coupled to the prism 8413, and an auxiliary blue LED array 8415 at the narrow end of the small 15° CPC 8414. As will become apparent from the following discussion of FIGS. 9 and 11, the 22.5° prism 8413 can also be designed as a trapezoidal prism by trimming the knife edge of the right angle triangle prism outside the area of the CPC 8414 (to the right as seen in FIG. 8), because that knife edge part is not used to transmit light. Due to their 15° angles, the wedge prisms 8403, 8409, and 8413 are difficult to manufacture as separate pieces, so in actual practice each would be molded as one piece with its respective plastic CPC 8402, 8410, or 8414. For optimal performance of dichroic filter 8406, it is desirable that it be coated on prism 8407. This position works best for controlling beam expansion of glancing rays in either direction.

Dichroic filter 8406 has two possible orientations, depending upon whether it is deposited at the top (as seen in FIG. 8) surface of prism 8405 or the bottom surface of prism 8407. The latter alternative displays somewhat better performance at high incidence angles, and is the preferred embodiment of this filter.

Figure 9:
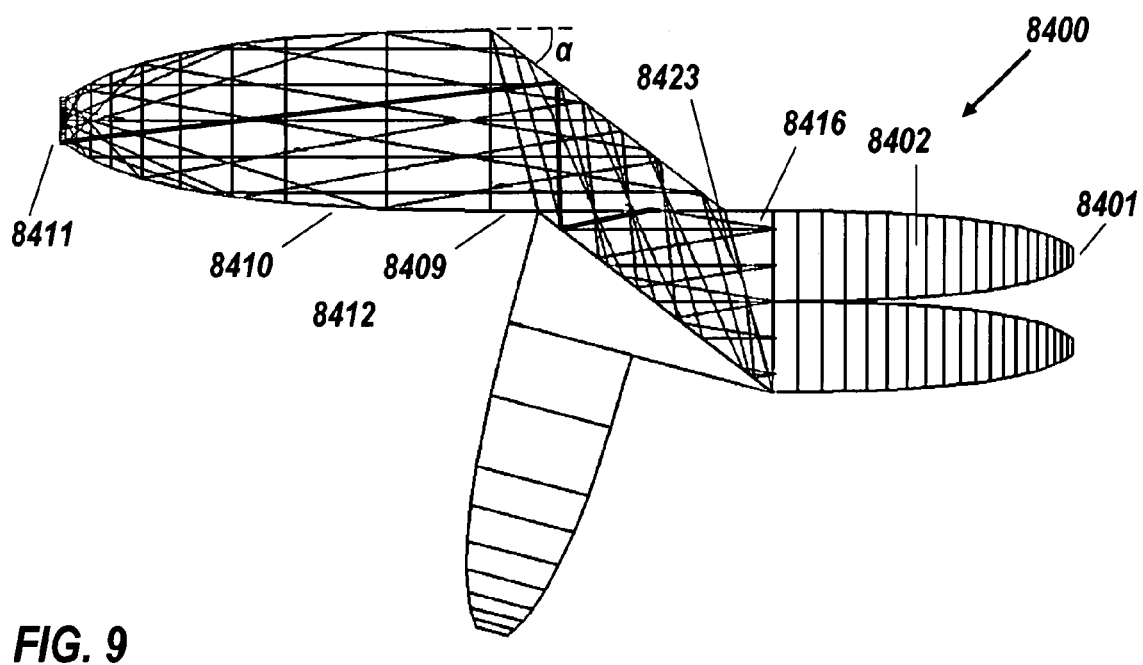
FIG. 9 shows the manifold of FIG. 8 passing photostimulative blue rays through to the phosphor.

FIG. 9 shows the photostimulative operation of remote phosphor system 8400. The system angle α of 37.5° is also shown. The blue emission of LEDs 8401 is collimated by square CPCs 8402 into a beam represented by left-going rays 8416, which are internally reflected off air gap 8412 to dichroic filter 8406, with confinement of glancing rays provided by low-index gap 8404 of FIG. 8, exemplified by glancing ray 8423, and by a similar low-index gap (which may be formed by a thick layer as discussed above) designed as a feature of the stack constituting filter 8406. Due to their short wavelengths, the rays pass through filter 8406, up into prism 8407, with confinement of glancing rays by low-index gap 8408. The rays total internally reflect off the prism's diagonal face, proceeding horizontally through low-index gap 8408 and across prism 8409 and into CPC 8410, which concentrates them into box 8411 to be absorbed by the transparent phosphor therein. Box 8411 has highly reflective walls on five of its sides, with only the top available to receive blue light and transmit yellow. Box 8411 can operate with either a transparent phosphor or a standard opaque phosphor material. The opaque phosphor should be highly absorbing of blue light so the blue light only penetrates a short distance.

Figure 10:
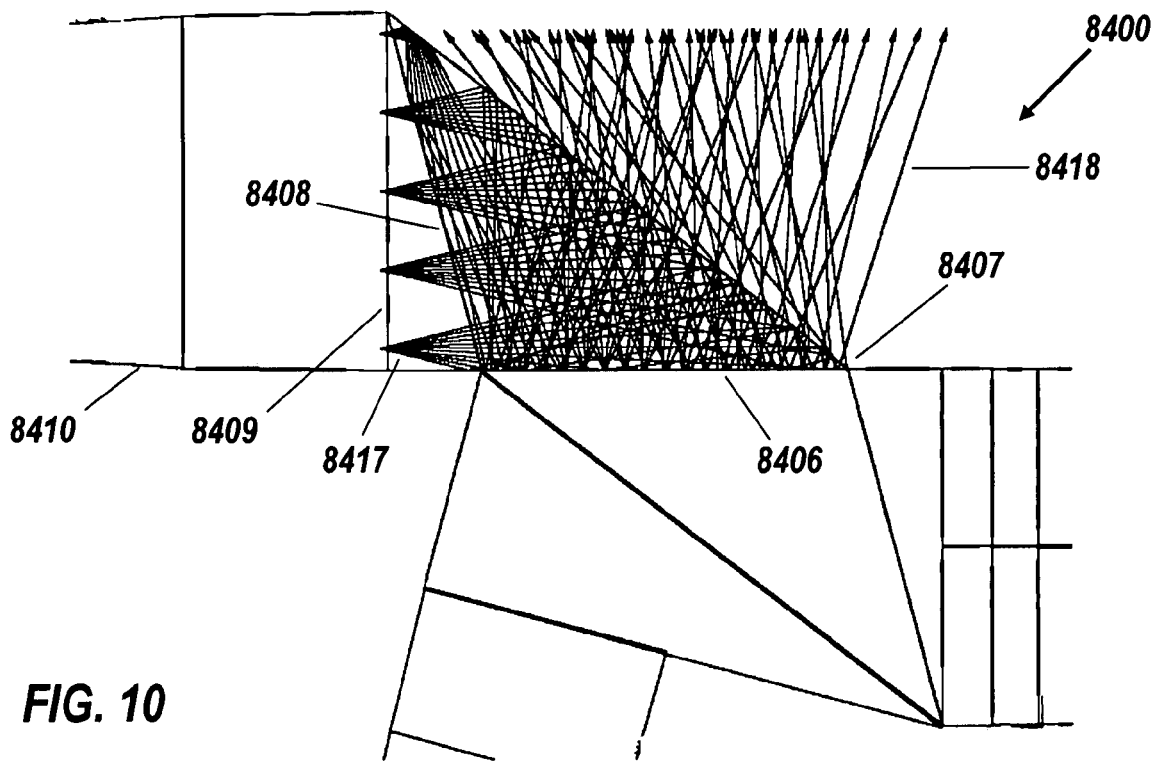
FIG. 10 shows the manifold of FIG. 8 passing yellow phosphor light into an output beam.

FIG. 10 is a close-up view of how the remote phosphor system 8400 directs its yellow output. The photostimulated light generated by the transparent phosphor within box 8411 of FIG. 8 is collimated by dielectric CPC 8410 into a beam represented by rays 8417, which proceed rightwards through prism 8409 and low-index gap 8408, with guidance of glancing rays provided by the exterior of prism 8409 and by filter 8406. The horizontal rays have an incidence angle of 90–α and thus are internally reflected downward by the diagonal face of prism 8407, onto filter 8406, at incidence angle 90–2α. The filter reflects them back upwards to the same diagonal face, at incidence angle 90–3α, which is less than the critical angle, so that they are refracted outwards into asymmetric yellow output beam 8418.

Figure 11:
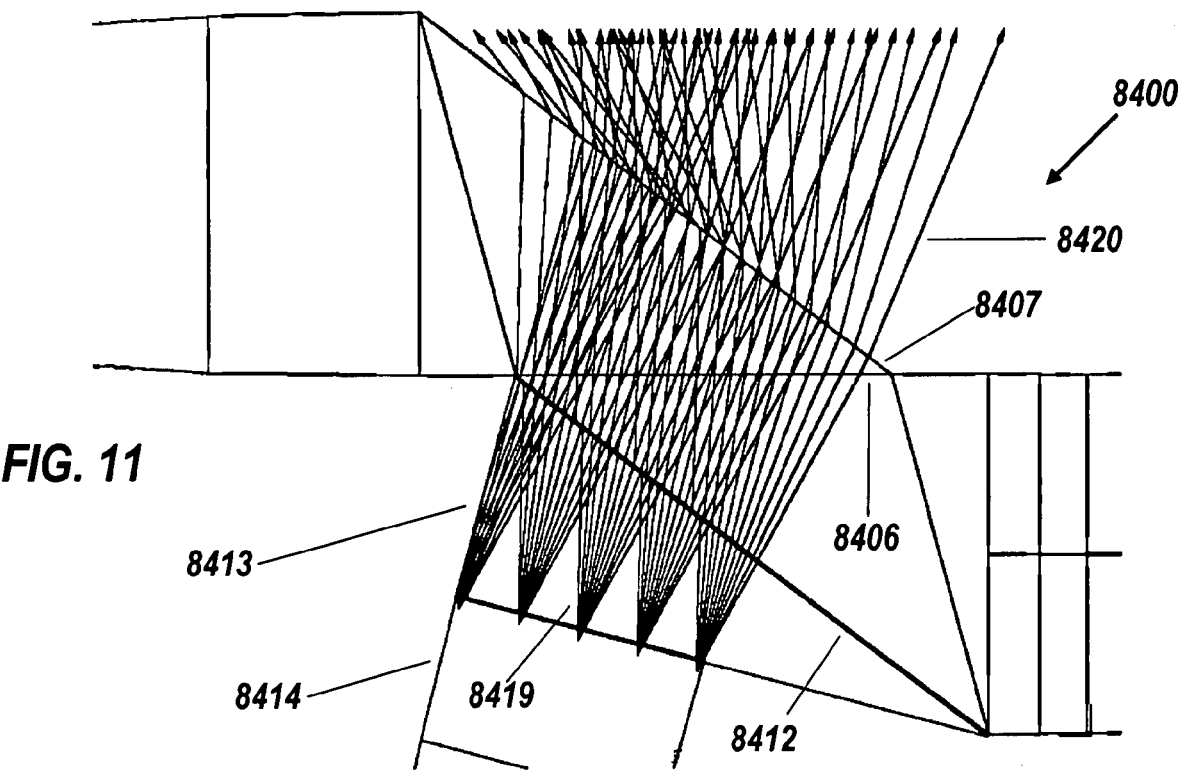
FIG. 11 shows the manifold of FIG. 8 passing auxiliary blue light into the same output beam.

FIG. 11 is a close-up view of how remote phosphor system 8400 directs its auxiliary blue output beam. Auxiliary blue LED array 8415 of FIG. 8 emits light that is collimated by CPC 8414 into an output beam represented by rays 8419, which in passing through prism 8413 are confined on the left by its exterior face. The rays pass through air gap 8412 and through prism 8405 to filter 8406, which passes them into prism 8407. They exit therefrom through its diagonal face to form asymmetric auxiliary blue output beam 8420, which combines with yellow output beam 8418 to produce a white resultant. Varying the output of LED array 8415, relative to that of photostimulative LEDs 8401, will alter the color temperature of the white resultant exit beam.

In system 8400, the dichroic filter 8406 is designed as a short-pass filter that operates for blue and yellow beams where the central angle of each beam strikes the filter at an incidence angle of 15°. However, it is possible to design system 8400 so that the central incidence angle of the beam (blue or yellow) is less or more by as much as 2°. This is accomplished by adjusting the angles of isosceles prisms 8405 and 8407, right angle prisms 8403 and 8409, and prism 8413. For example, if the central angle is reduced to 14°, then the angles of isosceles prisms 8405 and 8407 must be changed to 38°, 38° and 104° (the small angles are increased by one half a degree) while the 15° right angle prisms 8403 and 8409 become 14° right angle prisms. The angles for the prisms are determined as follows. The angle of incidence of the central ray on the filter is chosen, and that angle becomes the small angle of right triangle prisms 8403 and 8409. The large angle of isosceles triangles is equal to 90° plus the required angle of incidence on the filter.

In this example, this results in a 0.5° increase in the slope of the bottom face of prism 8405 proximate to air-gap 8412. As there is reflection at this interface via TIR, the directional change in degrees is double this or 2*0.5° or 1°. This in turn changes the angle of incidence of the central ray on the filter from 15° to 14°. One must calculate the critical angle for the full beam to determine whether TIR will work. As the incidence angle on the filter is reduced the index of refraction of prisms 8405 and 8407 may have to be increased to insure TIR for all rays.

The acute angles of right angle prism 8413 (which as mentioned above can be a trapezoidal prism) are also adjusted. In the 15° case the small angle of prism 8413 is 22.5°. In the example of a system with a 14° incidence central angle on the filter, the acute angle is increased by 1° from 22.5° to 23.5°. To determine the small angle of right angle prism 8413, the change in incidence angle on the filter from 15° is added to 22.5° in the case of reducing the incidence angle on the filter, or is subtracted from 22.5° in the case of increasing the angle of incidence.

Using the above approach it is possible to vary the central incidence angle on the filter by at least 2°, over a range from 13° to 17°. At the low end there may be some loss in performance unless very high index materials are used for the prisms.

Figure 12:
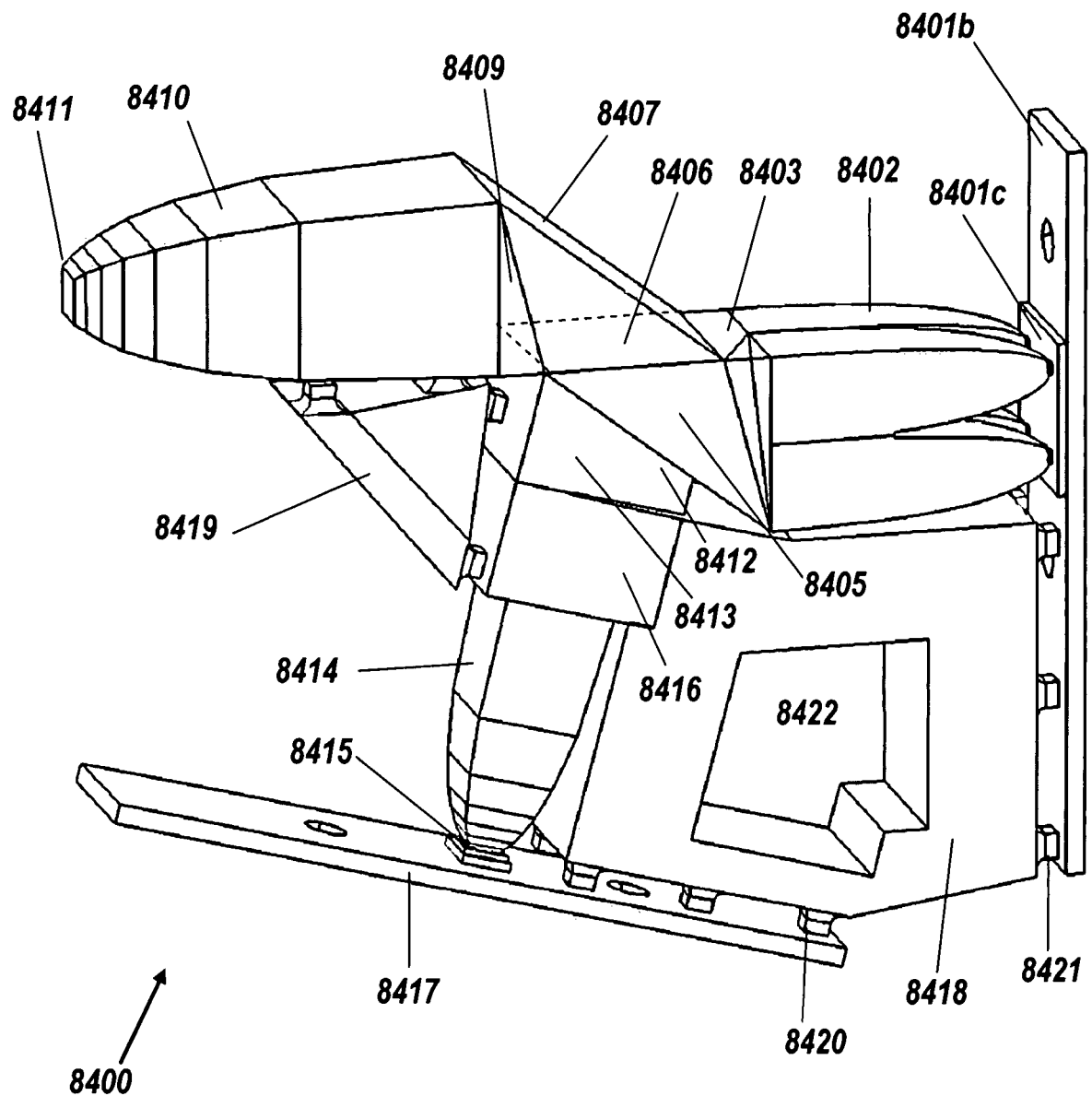
FIG. 12 is a perspective view of the manifold of FIG. 8, also showing a mounting.

FIG. 12 is a perspective view of an embodiment of a light source incorporating remote phosphor system 8400, showing photostimulating LEDs 8401, four 10° dielectric square CPCs 8402, first right-angle 15° prism 8403 coupled thereto, first isosceles triangular prism 8405, dichroic filter 8406 with one of the two aforementioned 80-layer specifications attached to second isosceles triangular prism 8407 (both at 37.5°), low-index gap 8408, second right-angle 15° prism 8409, large 15° dielectric CPC 8410, box 8411 enclosing a transparent phosphor, air gap 8412 between diagonal face of prism 8405 and adjacent right-angle 22.5° prism 8413, small 15° dielectric CPC 8414 coupled thereto, and auxiliary blue LED array 8415.

Also shown in FIG. 12 are connecting prism block 8416, mounting boards 8417 and 8401*b*, main holder-block 8418, and bracket 8419. Prism block 8416 has a male alignment feature (not shown) that is inserted in a female alignment feature (not shown) in bracket 8419. Bracket 8419 has threads for insertion of screws (not shown) so that prism block 8416 is mechanically held in place by said screws. The output from square CPC 8414 is designed so none of its rays strike the sides of prism block 8416, thereby facilitating the use of prism block 8416 as a means of attaching the entire optical assembly to main holder block 8418. In order to enhance the performance of the system, surfaces proximate to air where rays are exiting or entering, such as the exit surface of prism 8406, should have a broad band anti-reflective coating.

Bracket 8419 is used to attach the upper optical assembly comprising components 8402, 8403, 8405, 8406, 8409, 8410 to the lower optical assembly comprising 8412, 8413 and 8414 (which can be molded as one piece). In order to eliminate light leaking at the points where bracket 8419 touches CPC 8410 and prism 8413, the active surfaces of these optical components proximate to the attachment features of bracket 8419 can be coated with a thick layer of Silicon Dioxide. A suitable thickness for this coating is approximately 1 micron or two wavelengths. Low index layers 8404 and 8408 can be an optical adhesive with an index of refraction of approximately 1.5 or below. A suitable adhesive is OP-21 made by the Dymax Corporation of Torrington, Conn. The recommended thickness of the adhesive layer should be between 8 to 13 microns. This is also the recommended adhesive thickness for attaching prisms 8405 and 8407 together. Prism 8407 has dichroic filter 8406 deposited on its surface so that the adhesive layer is in fact in contact with prism 8405 and dichroic filter 8406. Alternatively, dichroic filter can be coated onto a thin flat substrate and the filter would be adhesively bonded to both prisms 8405 and 8407.

Main holder-block 8418 has mounting feature 8420 and 8421 on two of its faces, to enable attachment of the optical assembly to boards 8417 and 8401*b*. These features are designed so there is a gap of approximately 500 microns between features 8420 and 8421 and their respective boards 8417 and 8401*b*. Once the optical assembly is aligned with one of the boards, the gap is filled with a low-shrinkage adhesive (0.1%) bonding together the board to the optical assembly. Suitable adhesives are available from Dymax Corporation. By using a 0.1% shrinkage adhesive, combined with a precision alignment system, it is possible to align the optics to be within 10 microns in the z-direction of the theoretical ideal position. Additionally, by over-sizing the optics at their base to be approximately 200 microns wider than the size of the LEDs or LED array, very high coupling efficiencies can be achieved, on the order of 97% to 99%. In order to achieve this tolerance requirement of 10 microns in the z-direction and ±100 microns in the x and y directions, a specially designed positioning device is required. A typical system that can be used to achieve the required tolerances requires two separated assemblies. Assembly one is used to hold the board 8417 or

8401*b* (one at a time). This first assembly can come in two configurations, one consisting of two rotary tables mounted on top of each other, with a goniometer on top, and the other consisting of a rotary table with two goniometers mounted on top. Assembly number two is a standard x,y,z positioner. In order to properly align the optics at least two and preferably three cameras are needed, in order that the optic and an LED can be seen from three directions in real time. A suitable lens for these cameras to achieve the aforementioned tolerances is made by Edmunds Optics of New Jersey. The company sells a variety of zoom and fixed lenses that can be attached to CCD cameras using the standard c-mount. The required tolerances can be achieved by using a zoom lens with an optical magnification of 2.5× to 10×, in conjunction with a 19-inch monitor. The CCD or CMOS camera should have a resolution of 640×480 or better. It is advantageous to choose a monochrome or color camera that has a high sensitivity, on the order of 0.1 lux or better.

Main holder-block 8418 has a void feature 8422, which is used to attach the optical assembly to the x,y,z positioner. The void has two positions to accommodate coupling with a square rod. The two positions are rotated 15 degrees from each other to accommodate the 75 degree angle between board 8401*b* and board 8417.

In order to achieve high positioning tolerances, the part of the optics proximate to the LEDs should be designed to have void features to accommodate any wire bond coming up from the LED. It was found that a clearance of 50 to 80 microns around the wirebond in the z-direction is sufficient. A good solution is to have the wire bond of the LED be placed at the corner of the chip and coming out at either 45 degrees or at a 90 degree angle. In the x,y direction the void should accommodate a 100 micron travel in any direction. In addition, it was found that the bottom of each coupling optic should have a void. It was found that the height at the center of this void (at the center part of the optic) should be from 100 to 150 microns above the lowest part (nearest the LED) of the optic. The void then is tapered such that there is nearly zero space at the edge or boundary of the optic.

Figure 13:
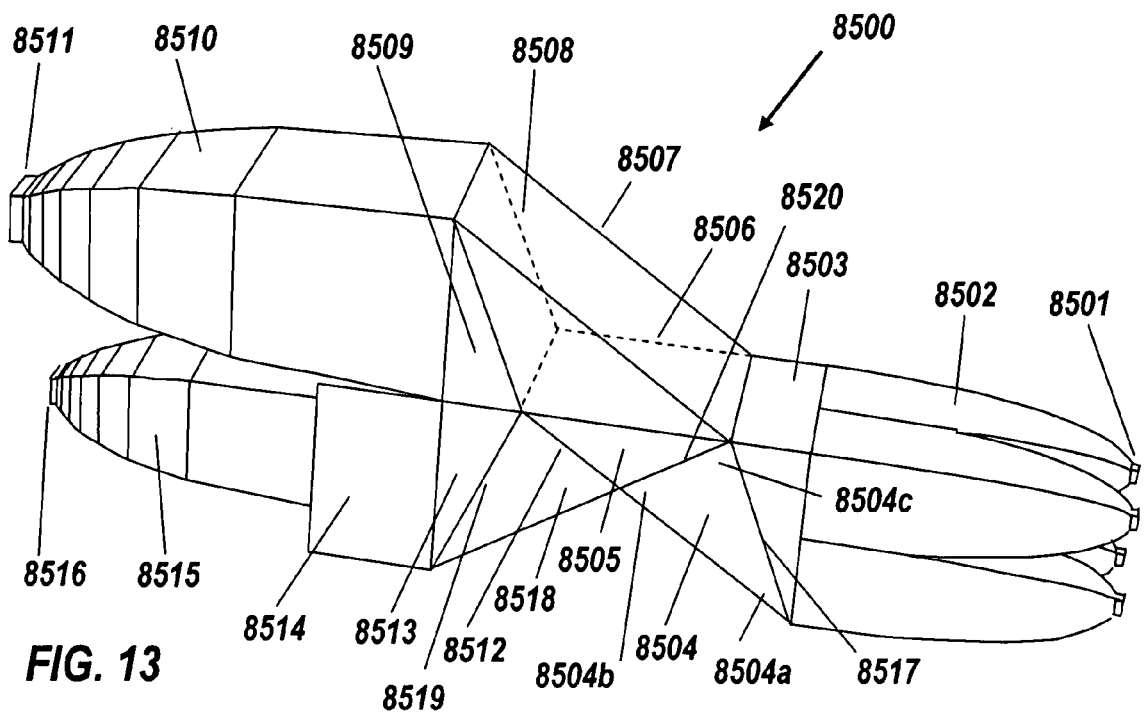
FIG. 13 shows an alternative configuration of a white-light optical manifold based on a 15°-incident dichroic filter.

FIG. 13 is a perspective view of an alternative arrangement of the same components as in FIG. 8, but with a higher parts count. Remote phosphor system 8500 comprises: photostimulating LEDs 8501; four 10° dielectric square CPCs 8502; first right-angle 15° prism 8503 coupled to triangular prism 8504 (with 37.5° angle 8504*a*, 75° angle 8504*b* and 67.5° angle 8504*c*), which in turn is coupled to prism 8503 by low-index gap 8517. System 8500 further comprises: small isosceles triangular prism 8505 (both angles are 37.5°), which is coupled to prism 8504 by low-index gap 8520; dichroic filter 8506 with aforementioned 80-layer specification; large isosceles triangular prism 8507 (angles 37.5°); low-index gap 8508; second right-angle 15° prism 8509, which is attached to large 15° dielectric CPC 8510; box 8511 enclosing a transparent or standard phosphor; air gap 8512 proximate to left short face of small isosceles prism 8505 and to upper face of triangular prism 8518 (the mirror image of triangular prism 8504) and third right-angle 15° prism 8513 (the mirror image of 8503), which is attached to prism 8518 by low-index gap 8519; block prism 8514; small 15° dielectric CPC 8515 coupled thereto; and auxiliary blue-LED array 8516. Dichroic filter 8506 ideally should be coated upon the bottom face of large isosceles triangular prism 8506. Block prism 8514 has inactive faces for means of attaching the optical train onto a mechanical holding fixture (not shown). This system produces the same white output beam as the embodiment of FIG. 8.

Figure 14:
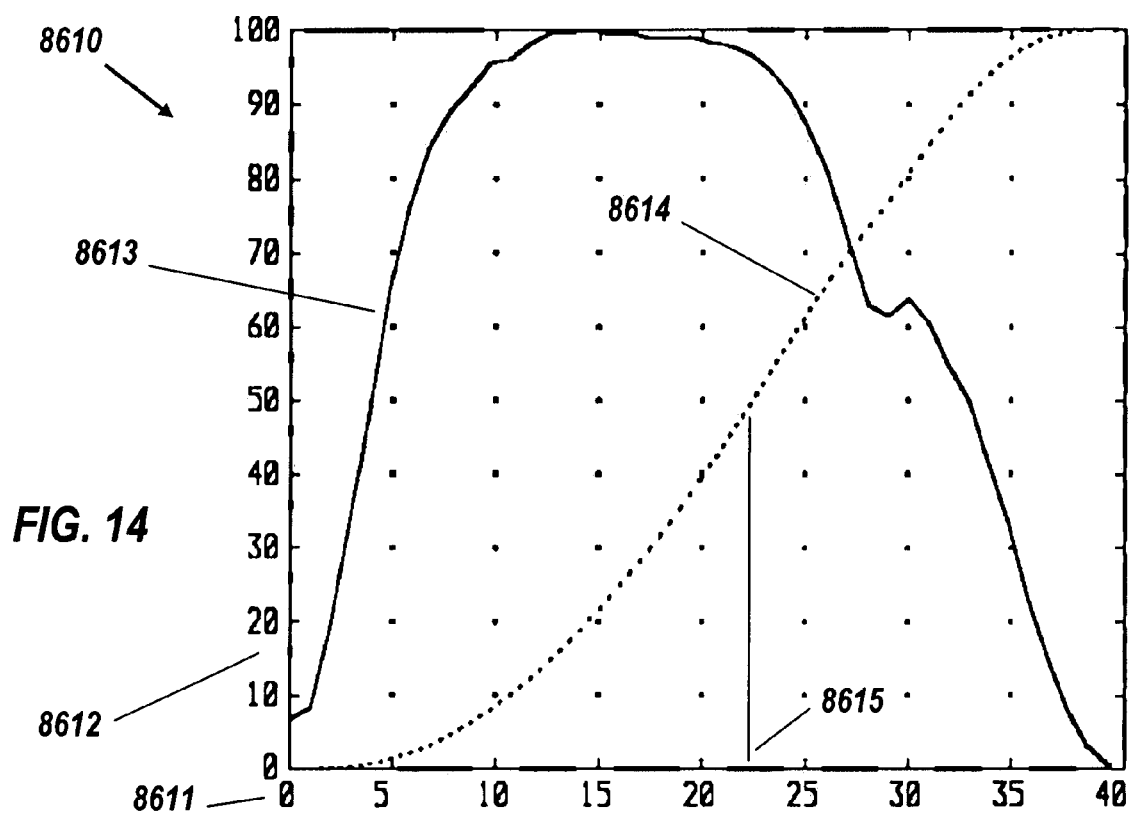
FIG. 14 is a graph of the angular distribution of auxiliary blue light incident on the filter.

In both the designs of FIG. 8 and FIG. 13, the dichroic filter experiences a range of incidence angles, which can be ascertained by ray-tracing. FIG. 14 shows graph 8610 with abscissa 8611 in degrees of incidence angle of photostimulating blue light 8401 passing through filter 8406 of FIG. 8. Ordinate 8612 is in percent relative to the maximum. Solid line 8613 is a graph of the distribution of radiant power passing through the filter, with maximum at 15°, the chief design angle. Dashed line 8614 is a graph of the cumulative distribution of energy, that encircled by a particular angle. It can be seen that the median, or 50%, value, shown by line 8615, is 22°, showing why a range of incidence angles must be used to evaluate a candidate filter design.

Figure 15:
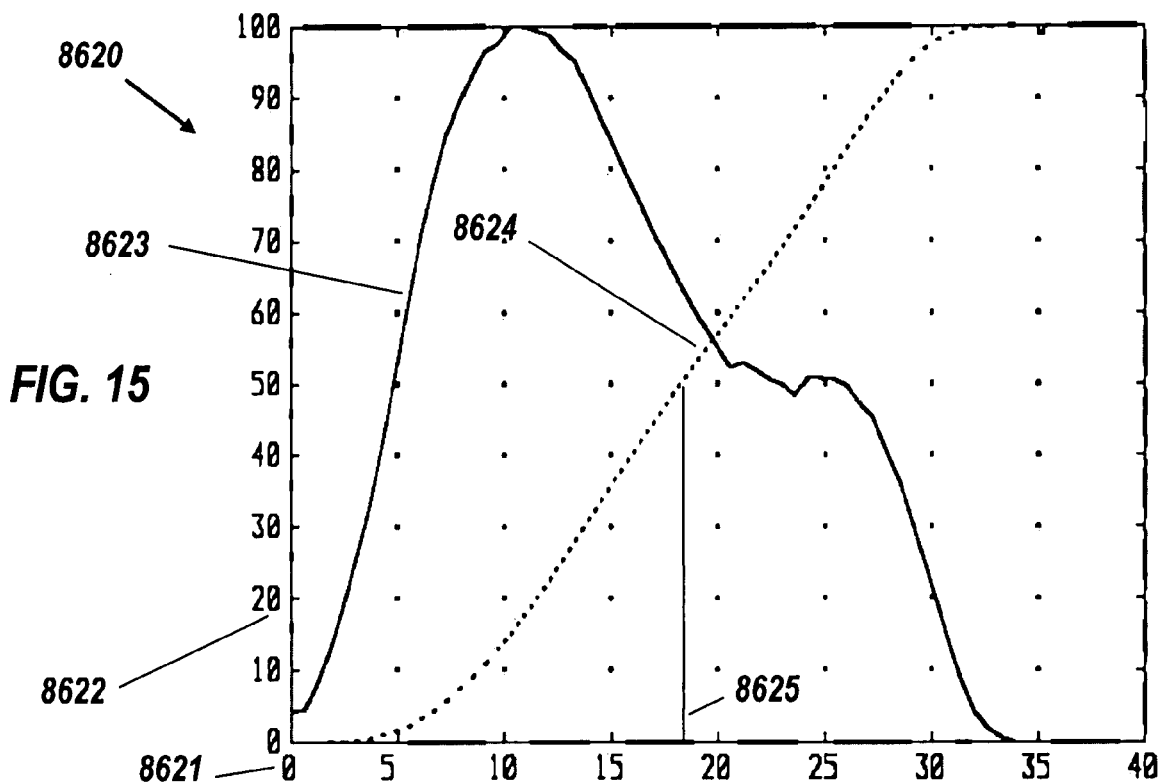
FIG. 15 is a graph of the angular distribution of photoluminescent blue light incident on the filter.

FIG. 15 shows graph 8620 with abscissa 8621 in degrees of incidence angle of auxiliary blue light 8419 passing through filter 8406 of FIG. 11. Ordinate 8622 is in percent. Solid line 8623 is a graph of the distribution of radiant power passing through the filter, with maximum at 12°, due to some extra internal reflections. Dashed line 8624 is a graph of the cumulative distribution of energy, that encircled by a particular angle. It can be seen that the median, or 50%, value is shown by line 8625 to be 18°, but this is similar enough to distribution 8615 of FIG. 14 as to give the same higher performance.

Figure 16:
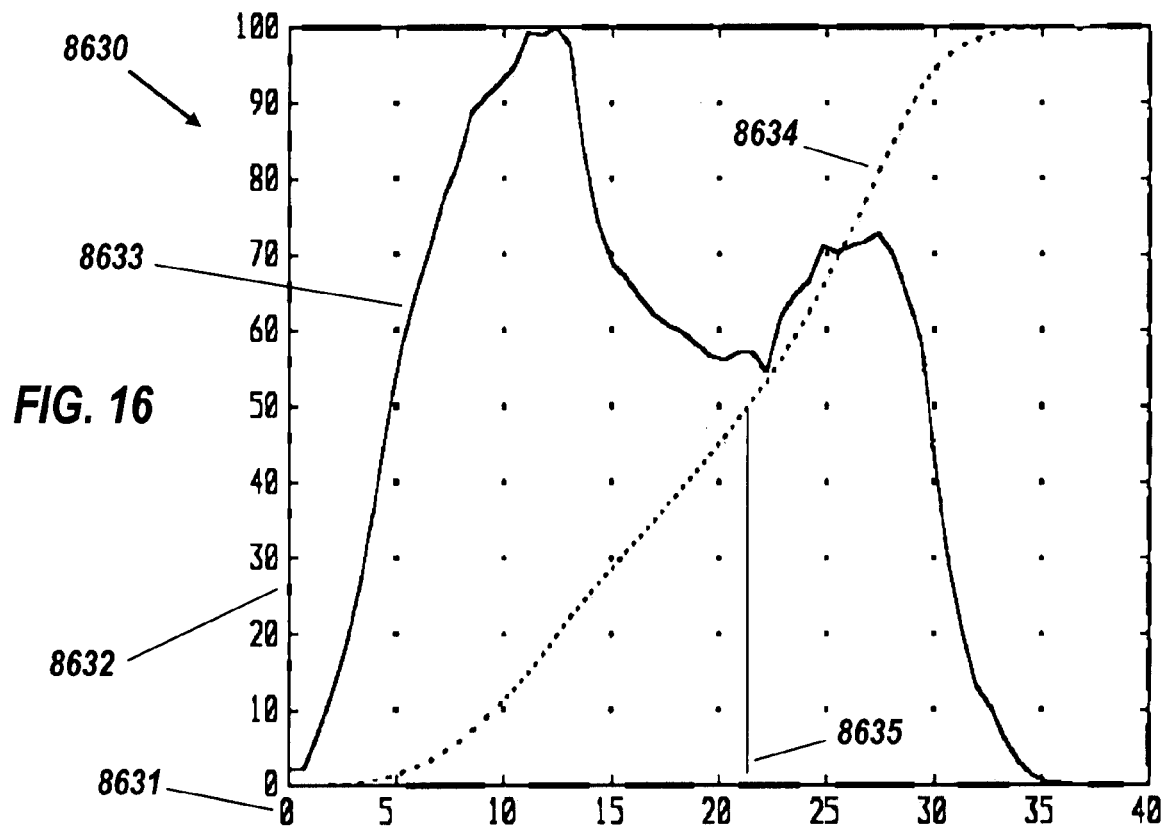
FIG. 16 is a graph of the angular distribution of yellow light incident on the filter.

FIG. 16 shows graph 8630 with abscissa 8631 in degrees of incidence angle of yellow light 8417 reflecting off filter 8406 of FIG. 10. Ordinate 8632 is in percent. Solid line 8633 is a graph of the distribution of radiant power reflected by the filter, with a maximum at 12-15°, and a secondary maximum at 24-27°. Dashed line 8634 is a graph of the cumulative distribution of energy, that encircled by a particular angle. It can be seen that the median, or 50%, value is shown by line 8635 to be 21°.

FIG. 17 shows spectral graph 8710, with abscissa 8711 for wavelength in nanometers and ordinate 8712 in percentage. Line 8714 graphs the cumulative spectral intensity of the photostimulative blue LEDs 8401 of FIG. 8, with the accumulation done with decreasing wavelength. Line 8715 is the cumulative spectral intensity of the yellow phosphor, with the accumulation done with increasing wavelength. Both curves rise up from their crossing point at about 500 nm. Spectral transmission curves 8716 are displayed for incidence angles from 5° to 30°, showing the downward shift in wavelength with increasing incidence angle, as predicted by theory.

FIG. 18 shows spectral graph 8720, with abscissa 8721 for wavelength in nanometers and ordinate 8722 in percentage. Line 8723 graphs the photostimulative blue spectrum. Line 8724 graphs the auxiliary blue spectrum, at a 20 nm longer peak wavelength. Line 8725 graphs the phosphor spectrum. Line 8726 graphs the overall filter response, combining the curves 8716 of FIG. 17 into one, weighted in accordance with the angular distribution of power as shown in FIGS. 14, 15, and 16. That is, for the curves 8716 the resultant is the sum of: 3% of the 5° curve, 12% of the 10° curve, 30% of the 15° curve, 30% of the 20° curve, 20% of the 25° curve, and 5% of the 30° curve. This equivalent filter curve holds only for this distribution of incidence angles. When the filter curve is weighted by LED curve 8723, the score is 97%, and by phosphor curve 8725 the score is 98.2%. Their product of 95.2% represents the filter's excellent combined performance in producing white light.

This high performance-score of the filter is for the light at low incidence angles. As seen in FIG. 9 and FIG. 10, however, there are some rays striking the filter at high incidence angles, and these rays must be totally reflected in order to remain with the rest of the rays in their respective beams. In FIG. 9, the topmost of blue rays 8416 have incidence angles of 80° and more. When these rays encounter the first filter layer, its low refractive index causes total internal reflection. Within prism 8407, rays at high incidence angle will enter the filter, but its bottom layers turn out to have very high reflectance at all wavelengths.

Figure 19:
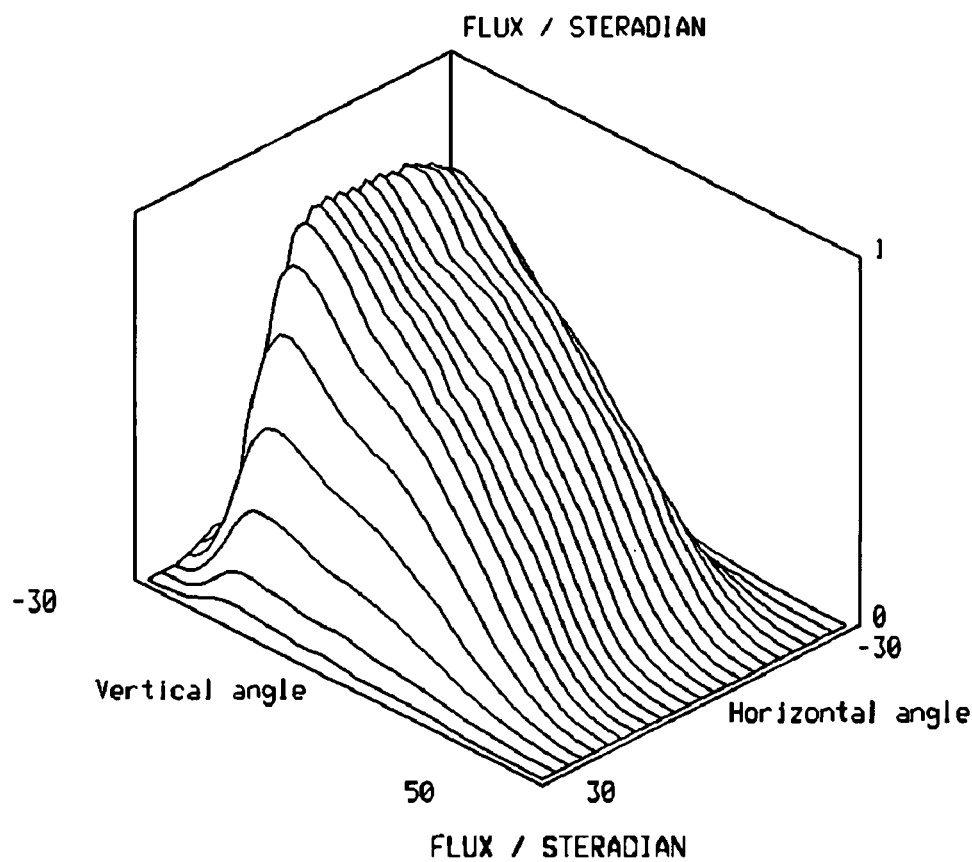
FIG. 19 shows an asymmetric intensity pattern of a single manifold.
Figure 20:
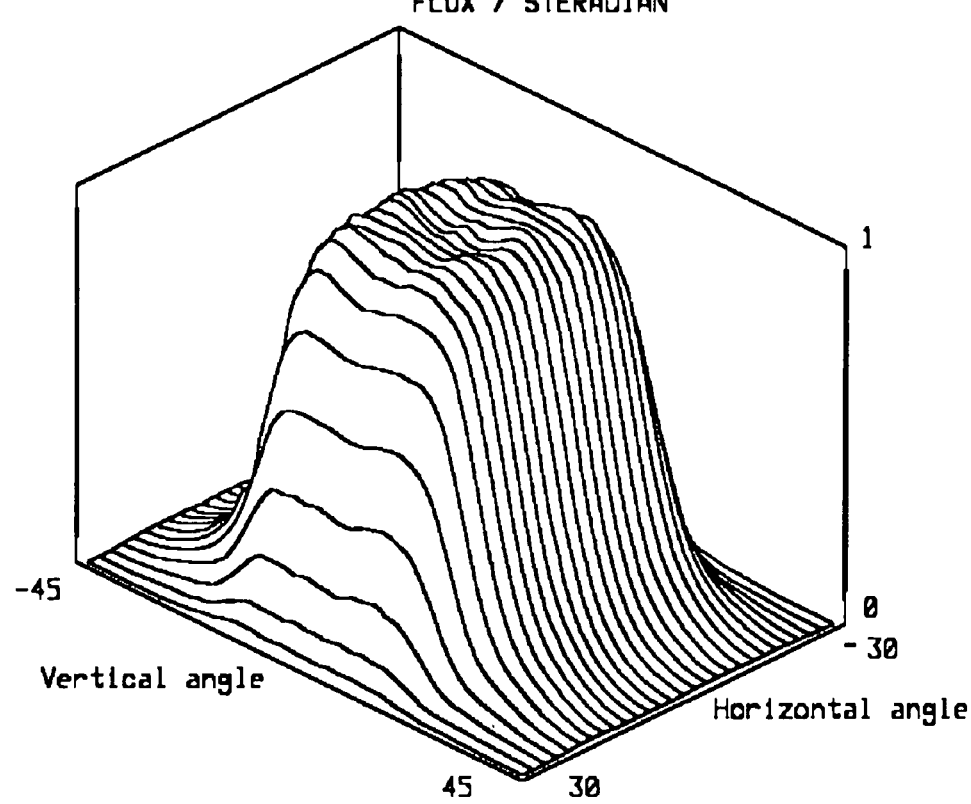
FIG. 20 shows a well-defined flat-top intensity pattern produced by two manifolds oppositely mounted side-to-side.

FIG. 19 shows a graph of the asymmetric far-field intensity of the white resultant beam. When two of the systems 8400 of FIG. 8 are adjacently disposed with opposite placement of their blue and yellow sides, they combine into a much more useful beam. FIG. 20 shows a graph of the high-quality square beam generated in the far field (beyond ten device widths) by the two adjacent remote phosphor systems. Systems 8400 with a combined volume that is relatively compact, about 2" (5 cm) across can generate sufficient intensity for most downlight applications, given the luminosity of the latest blue LEDs. The square pattern is 60° across at half maximum, suitable for illuminating an 8' (2.5 meter) long table from a 10' (3 meter) high ceiling. Such square patterns usually require expensive and bulky projection floodlights, showing the commercial benefits of system 8400 of FIG. 8.

Although specific embodiments have been described, various modifications may be made without departing from the spirit and scope of the invention as defined in the appended claims. For example, the embodiment shown in FIG. 1 can be designed to operate using a long-pass filter instead of a short-pass filter by exchanging the positions of CPC 8106 with phosphor 8107 and CPC 8104 with auxiliary blue LED 8103. This alternative approach can be applied to many of the embodiments shown herein, including the embodiments of FIGS. 4 and 8, as should now be obvious to one skilled in the art of nonimaging optics or a related field.

For example, various gaps at which rays with a high angle of incidence are reflected and rays with a low angle of incidence are transmitted are identified in the embodiments as "air gaps" or "low-index gaps." Any of these gaps may be filled with air, or with a solid, liquid or other material having a lower refractive index than the prisms and/or CPCs bounding the gap. Air, because of its low refractive index, is preferred where a low minimum angle of incidence for reflection is desired. An adhesive material may be preferred where a structural connection between the bounding elements is desired. A solid low-index medium may be preferred to control loss by reflection of low incidence angle rays.

The invention claimed is:

1. An optical system comprising at least one source of a beam of first light with divergence under 15°, a phosphor that emits second light when excited by said first light, a collimator disposed with said phosphor and forming a beam of said second light therefrom with divergence under 15°, and a dichroic filter positioned to transmit said beam of first light to the phosphor and to reflect said beam of second light to an exit aperture, said beams of first and second light being incident upon said filter with a central angle in the range from 13° to 17° and a distribution of incidence angles thereabout between 0° and 30°.

2. The optical system of claim 1, wherein the dichroic filter is highly reflective to light of wavelengths within a pass-band but incident upon the filter at high angles of incidence, and wherein a beam of light within the pass-band of the filter is directed therethrough by a reflecting surface, and wherein said beam of light within the pass-band of the filter approaches said reflecting surface across said filter at an angle such that extreme rays of said beam are reflected by said filter onto said reflecting surface.

3. The optical system of claim 1, comprising at least one source with a central axis substantially parallel to the filter, and wherein light is directed from the source to the filter via a reflective surface that makes an angle α of 37.50°±1° with the filter.

4. The optical system of claim 3, wherein the reflective surface is formed by an internally reflecting surface so that light incident on the reflective surface along the central axis of the source (angle of incidence 90°−α) is totally internally reflected to the filter, but so that when that light is reflected from the filter and is returned to said reflective surface (angle of incidence 90°−3α) the returned light is not totally internally reflected and thus joins said exit beam.

5. The optical system of claim 1, comprising at least one source with a central axis at an angle of 75° to the filter.

6. The optical system of claim 1, wherein at least one said source of the first light has a central axis substantially parallel to the filter on a first side of the filter, a device comprising the phosphor has a central axis substantially parallel to the filter on a second side of the filter, first and second reflective surfaces at an angle of α=37.5°±1° to the filter on the first and second sides of the filter, at least the second reflective surface being internally reflective of light from the phosphor but transmissive at sufficiently high angles of incidence the system being aligned such that the first light from the source reflects off the first reflective surface, passes through the filter, reflects off the second reflective surface, and is incident on the phosphor, and that the second light from the phosphor reflects off the second reflective surface, reflects off the filter, and exits through the second reflective surface.

7. The optical system of claim 6, wherein the first reflective surface is internally reflective of the first light from the source, further comprising a source of third light closer in wavelength to the first light than to the second light aligned to shine in through the back of the first reflective surface, through the filter, and exit through the second reflective surface.

8. The optical system of claim 1, wherein the first light is blue visible light, and the second light is yellow visible light.

9. The optical system of claim 7, wherein the first light is blue visible light, the second light is yellow visible light, and the third light is blue light of longer wavelength than the first light.

10. An optical system comprising at least one source of a beam of blue light with divergence under 15°, a phosphor that emits yellow light when excited by said blue light, a collimator disposed with said phosphor and forming a yellow beam therefrom with divergence under 15°, and a dichroic filter positioned to transmit said beam of blue light to the phosphor and to reflect said beam of yellow light to an exit aperture, wherein said optical system is so configured that said beams of blue and yellow light are incident upon said filter with a central angle of 22°±2° and a distribution of incidence angles thereabout between 7° and 37°.

11. The optical system of claim 10, further comprising a source of a second beam of blue light of longer wavelength than said first beam, so disposed as to pass through said filter and in parallel spatially overlap said yellow beam in its travel to said exit aperture.

12. The optical system of claim 10, wherein the dichroic filter is highly reflective to light of wavelengths within a pass-band but incident upon the filter at high angles of incidence, and wherein a beam of light within the pass-band of the filter is directed therethrough by a reflecting surface, and wherein said beam of light within the pass-band of the filter approaches said reflecting surface across said filter at an angle such that extreme rays of said beam are reflected by said filter onto said reflecting surface.

13. The optical system of claim 10, comprising at least one source with a central axis substantially parallel to the filter, and wherein light is directed from the source to the filter via a reflective surface that makes an angle β of 34° with the filter.

14. The optical system of claim 10, wherein the reflective surface is formed by an internally reflecting surface so that light incident on the reflective surface along the central axis of the source (angle of incidence 90°−β) is totally internally reflected to the filter, but so that when that light is reflected from the filter and is returned to said reflective surface (angle of incidence 90°−3β) the returned light is not totally internally reflected and thus joins said exit beam.

15. The optical system of claim 10, comprising at least one source with a central axis at an angle of 68°±2° to the filter.

16. The optical system of claim 10, comprising a source of blue light with a central axis substantially parallel to the filter on a first side of the filter, a device comprising a phosphor with a central axis substantially parallel to the filter on a second side of the filter, first and second reflective surfaces at an angle of β=34° to the filter on the first and second sides of the filter, at least the second reflective surface being internally reflective of light from the phosphor but transmissive at sufficiently high angles of incidence, the system being aligned such that blue light from the source reflects off the first reflective surface, passes through the filter, reflects off the second reflective surface, and is incident on the phosphor, and that yellow light from the phosphor reflects off the second reflective surface, reflects off the filter, and exits through the second reflective surface.

17. The optical system of claim 14, wherein the first reflective surface is internally reflective of blue light from the source, further comprising a second source of blue light aligned to shine in through the back of the first reflective surface, through the filter, and exit through the second reflective surface.

18. An optical system comprising at least one source of a beam of blue light with divergence under 15°, a phosphor that emits yellow light when excited by said blue light, a collimator disposed with said phosphor and forming a yellow beam therefrom with divergence under 15°, and a dichroic filter inclined 45° and positioned to reflect all of one polarization and part of the other polarization of said beam of blue light to the phosphor and to reflect said beam of yellow light to an exit aperture, said beams of blue and yellow light being incident upon said filter with a central angle of 45° and a distribution of incidence angles thereabout between 30° and 60°, said system further comprising a polarization rotating retroreflector which returns a second part of said polarized blue light not previously reflected by said filter to said filter, which reflects said second part of said blue light out said exit aperture in parallel alignment and overlap with said yellow beam.

19. An optical system comprising at least one source of a beam of blue light with divergence under 15°, a phosphor that emits yellow light when excited by said blue light, a collimator disposed with said phosphor and forming a yellow beam therefrom with divergence under 15°, and a dichroic filter in air inclined 45° and positioned to reflect 90% or more of one polarization and 50% or more of the other polarization of said beam of blue light to the phosphor and to reflect said beam of yellow light to an exit aperture, said beams of blue and yellow light being incident upon said filter with a central angle of 45° and a distribution of incidence angles thereabout between 30° and 60°.

* * * * *